G. B. WAITE.
TIRE PROTECTOR.
APPLICATION FILED FEB. 3, 1916.
1,275,633.
Patented Aug. 13, 1918.
2 SHEETS—SHEET 1.
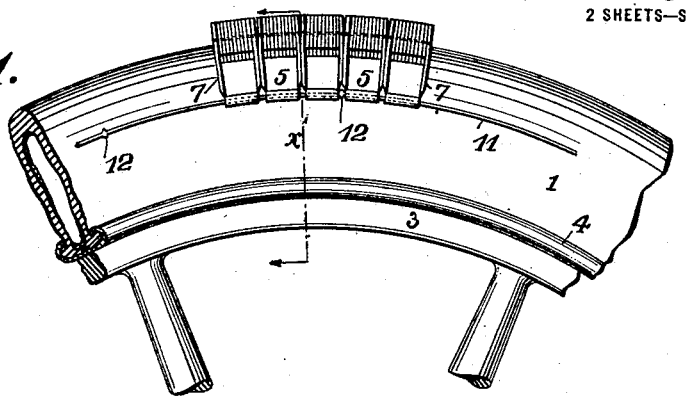
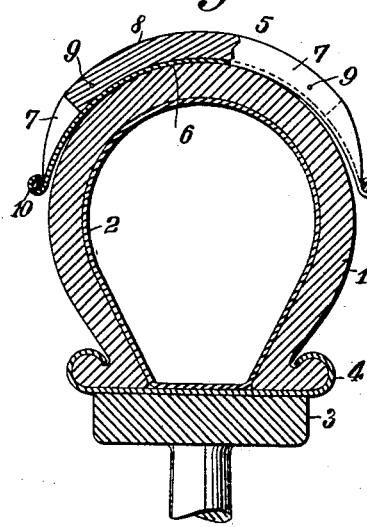
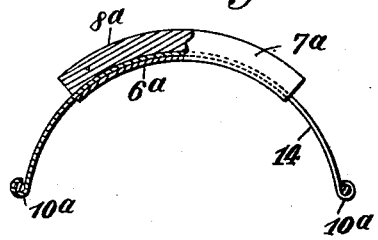
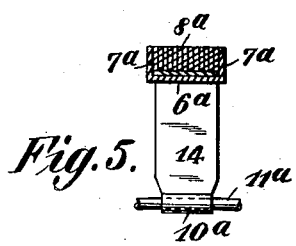
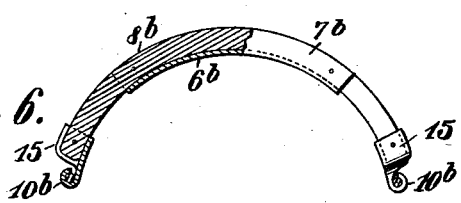
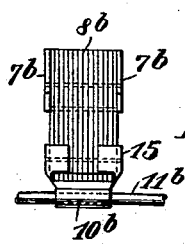
Witnesses:
Fred Rogers,
John A. Eades,
Inventor
Guy B. Waite
By Attorney
Wm Bodge

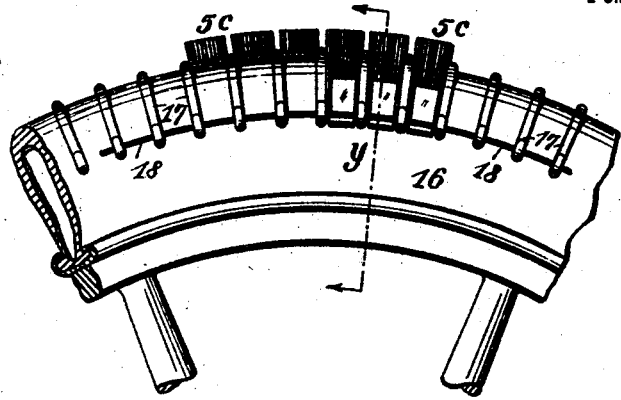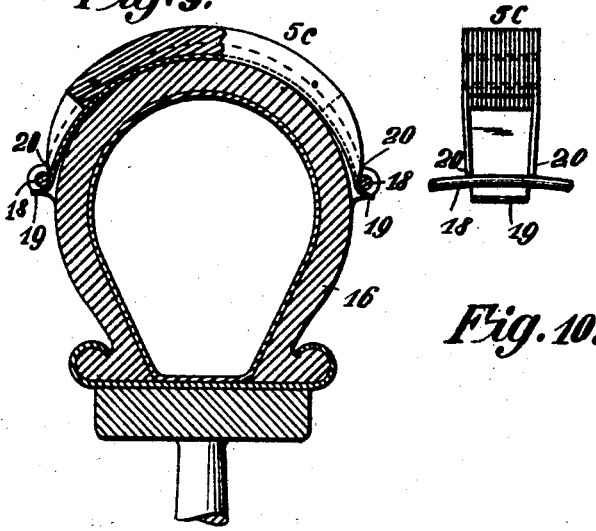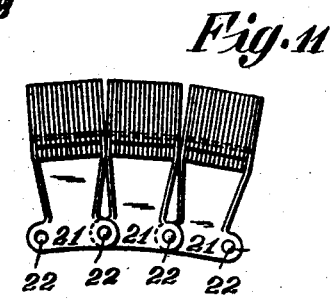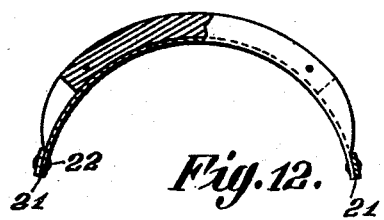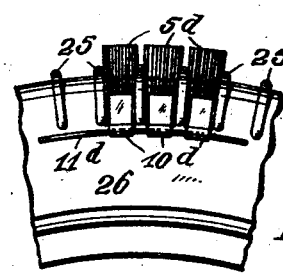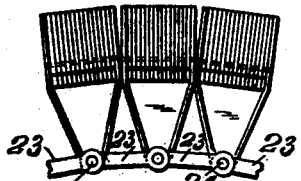

UNITED STATES PATENT OFFICE.

GUY B. WAITE, OF NEW YORK, N. Y.

TIRE-PROTECTOR.

1,275,633.   Specification of Letters Patent.   Patented Aug. 13, 1918.

Application filed February 3, 1916. Serial No. 75,989.

*To all whom it may concern:*

Be it known that I, GUY B. WAITE, a citizen of the United States, and resident of New York city, in the county of New York and State of New York, have invented certain new and useful Improvements in Tire-Protectors, of which the following is a specification.

The invention relates to tire protectors in which a plurality of similar tread-blocks are detachably secured to the wearing portion of a tire to protect the same against excessive wear, puncture, or other injury; and the objects of the invention include means for forming the tread-blocks to resist the extreme working stresses thereon, to afford an effective tractive surface against slipping or skidding, and to provide means for connecting the several tread-block sections together and to the tire in a transversely-resilient manner and also to prevent material movement of the sections circumferentially around the tire.

In describing the invention in detail, reference is had to the accompanying drawings, forming a part of this specification, and wherein like characters of reference are used to designate corresponding parts throughout the several views, and in which:

Figure 1 is a side view of a portion of a wheel-tire shown in connection with a number of sections of the protector embodied in the present invention; Fig. 2, an enlarged transverse section of the tire taken on the broken line *x*, Fig. 1, the same view indicating the side view of a protector, partially in section, transversely seated upon the tire; Fig. 3, an end view of the protector shown in Fig. 2, and corresponding with that indicated in Fig. 1; Figs. 4 and 5 respectively designate the side and end views of a modified form of protector, both views being partially in section; Figs. 6 and 7 respectively show the side and end views of a second modification of the protector, the side view being likewise shown partially in section; Fig. 8, a side view of a portion of a wheel-tire of modified construction having transversely-arranged integral ribs for spacing and retaining the protectors, a number of the latter being shown in transverse section; Fig. 9, an enlarged transverse sectional view of the tire taken on broken line *y*, Fig. 8, the same view indicating a partially sectional side view of a protector; Fig. 10, an end view of the latter, shown together with a portion of a retaining rod; Fig. 11, a further modification, in which an end view of a plurality of protectors are shown having their ends shaped to form link-ends adapted to be pivotably connected together around the tire; Fig. 12, a side view of the latter, shown partially in section; Fig. 13 is a further modification showing the side view of a plurality of protectors having their ends arranged to be connected by separate links to form a chain connection extending circumferentially around the tire; and Fig. 14 illustrates a side view of a portion of a modified form of wheel-tire on which are mounted protector sections constructed similarly to those shown in Figs. 1, 2 and 3.

In the drawings, numeral 1 designates an ordinary pneumatic wheel-tire, provided with the usual inner tube 2 and secured in well-known manner to the wheel-felly 3 by the rim 4. Extending circumferentially around the tire and seated transversely thereon are a plurality of narrow tread-blocks 5, each thereof consisting of a sheet-metal case curved to form a seat 6, conforming substantialy with the tread portion of the tire, and, as indicated in Fig. 2, having the curve of its inner concave surface somewhat enlarged at its opposite ends to permit of the compression and lateral resilience of the tire under load without material distortion. Along the opposite side edges of the seat are formed the outwardly-extending side flanges 7, which constitute retaining and wearing members and are adapted to receive and securely hold the traction member 8 by the pins 9 or other obvious means. The traction member is preferably composed of layers of fabric cemented together with rubber in well-known manner and forms a resilient body having an edgewise laminated wearing surface, laterally supported by the flanges 7. Loops 10 are formed at the opposite ends of the case and engage resilient annular connection rods 11, disposed on opposite sides of the tire. At intervals along the connection rods, abutments 12 are formed by compressing and laterally spreading the metal thereof, to form stops which engage the side edges of the loops either severally or in series and prevent the movement of the tread-blocks along the annular rods. It will be evident that cables may be employed in lieu of the annular connection rods and that various means may be provided for spacing these traction blocks thereon and holding the same against displacement.

As shown in Fig. 3, the side flanges of the tread-blocks extend nearly to the looped ends and serve to protect the sides of the tire against wear.

In the modification shown in Figs. 4 and 5, the seat of the metal case forming the tread-block is indicated by 6ª, and 7ª indicates the side flanges thereof. Secured to the top of the case between the side flanges is a spring-metal strip 14, the opposite ends thereof projecting from the ends of said case and provided with loops 10ª for engagement with the annular connection rods 11ª, corresponding with the ones indicated by numeral 11 in Figs. 1, 2, and 3. In this modification 8ª designates the traction member which is secured to the case exteriorly of the spring-metal strip 14. The latter, while being shown as formed in one continuous strip, may obviously be made in two parts and constitute resilient end extensions fixed to the case.

In the modification shown in Figs. 6 and 7, the metal case forming the tread-block is indicated as provided with the seat 6ᵇ, the side flanges 7ᵇ, and elongated resilient traction members 8ᵇ, the latter being secured in place between the side flanges and having its opposite ends projecting from the ends of the case and provided with clips 15, secured thereon in any approved manner. Loops 10ᵇ are formed on the ends of the clips and engage the annular rods 11ᵇ, disposed on the opposite sides of the tire in accordance with the connections for the several above described forms of protectors.

In the modification shown in Figs. 8, 9, and 10, the tire 16 is provided with integral ribs 17, extending transversely over the tread portion thereof and having their opposite ends suitably formed to hold the annular retaining rods 18. Seated upon the tire between the ribs 17 are the tread-blocks 5ᶜ, the opposite ends of the case thereof being outwardly bent at 19, to engage the retaining rods 18, the side flanges of said case also engaging said rods at 20 to laterally maintain the position of the block upon the tire.

In the modification shown in Figs. 11 and 12, the opposite ends of the protector cases are shaped to form link-ends 21, pivotally connected together at 22 and constituting a chain connection for the protectors extending circumferentially of the tire. In Fig. 13, as a further modification, the opposite ends of the protector cases are connected together by separate links 23, the pivots thereof being shown at 24.

And in the modification shown in Fig. 14, integral projecting spacing ribs 25 are formed on the tire 26, and between which ribs are positioned the protector sections 5ᵈ, the latter being constructed and connected together for support upon the tire in a manner similar to that shown in Figs. 1, 2, and 3 by the loop-ends 10ᵈ and the connection rods 11ᵈ.

While I have shown and described the tread-blocks as being secured together at their opposite ends by annular connection rods, cables, or chains, it is to be understood that this connection may also be otherwise constructed to conform in a yielding manner with the normal circle of the tire, and the working deflection thereof.

As thus formed the sectional protector provides an efficient yielding traction surface, offers little or no resistance to the resilience of the tire, and serves to effectually preserve the same against injury and wear.

What I claim as my invention and desire to secure by Letters Patent is:

1. A tire-protector comprising a plurality of tread-blocks, each thereof consisting of a case extending transversely of the tire and having a seat conforming substantially with the tread portion thereof, outwardly extending side flanges formed along the opposite side edges of said seat and constituting retaining and wearing members, a spring metal strip secured to said case and extending from the opposite ends thereof, a resilient traction member confined in said case between the side flanges thereof and consisting of fabric layers disposed to present an edgewise wearing surface, and means for detachably securing the free ends of said spring metal strip to the tire.

2. A tire tread block consisting of a case extending transversely of the tire and having a seat conforming substantially with the tread portion thereof, outwardly extending side flanges formed along the opposite side edges of said seat and constituting retaining and wearing members, a spring metal strip secured to said case and extending from the opposite ends thereof, a resilient traction member confined in said case between the side flanges thereof and consisting of fabric layers disposed to present an edgewise wearing surface, and means formed on the free ends of said spring metal strip for detachable connection to the tire.

Signed at New York, in the county of New York and State of New York, this 1st day of February, A. D. 1916.

GUY B. WAITE.

Witnesses:
FRANK GIORGIO,
JOHN A. EADES.